(12) United States Patent
Lachapelle et al.

(10) Patent No.: US 7,543,673 B2
(45) Date of Patent: Jun. 9, 2009

(54) WHEELED VEHICLE WITH WATER DEFLECTORS

(75) Inventors: Daniel Lachapelle, Sherbrooke (CA); Bruno Bedard, Valcourt (CA); Dany Duval, Orford (CA)

(73) Assignee: Bombardier Recreational Products Inc., Valcourt (CA)

( * ) Notice: Subject to any disclaimer, the term of this patent is extended or adjusted under 35 U.S.C. 154(b) by 297 days.

(21) Appl. No.: 11/457,674

(22) Filed: Jul. 14, 2006

(65) Prior Publication Data

US 2008/0023242 A1    Jan. 31, 2008

(51) Int. Cl.
*B62D 61/06* (2006.01)
(52) U.S. Cl. .................................. 180/210; 280/62
(58) Field of Classification Search ............... 180/84, 180/210, 219; 280/288.4, 304.3, 847, 770, 280/62; D12/186
See application file for complete search history.

(56) References Cited

U.S. PATENT DOCUMENTS

| | | | |
|---|---|---|---|
| 4,787,470 A * | 11/1988 | Badsey | 180/210 |
| 5,564,517 A * | 10/1996 | Levasseur | 180/185 |
| D458,562 S | 6/2002 | Kalhok | |
| D493,750 S | 8/2004 | Crepeau | |
| 2003/0221890 A1 | 12/2003 | Fecteau | |
| 2005/0039967 A1 | 2/2005 | Aube et al. | |
| 2006/0254842 A1* | 11/2006 | Dagenais et al. | 180/215 |
| 2007/0228714 A1* | 10/2007 | Bowers | 280/770 |
| 2007/0251745 A1* | 11/2007 | Codere et al. | 180/210 |

FOREIGN PATENT DOCUMENTS

| | | | |
|---|---|---|---|
| CA | 2442995 A1 | 3/2004 | |
| JP | 60169381 A2 | 9/1985 | |
| JP | 05246366 A | 9/1993 | |

* cited by examiner

*Primary Examiner*—Tony H. Winner
(74) *Attorney, Agent, or Firm*—Osler, Hoskin & Harcourt LLP

(57) ABSTRACT

A vehicle has a straddle seat, a left front wheel and a right front wheel. Each of the front wheels is mounted to the vehicle via a front suspension. Each front wheel has a fender associated therewith. At least one rear wheel is mounted to the vehicle via a rear suspension. A left footrest is disposed on a left side of the vehicle at a location below the straddle seat. A right footrest is disposed on a right side of the vehicle at a location below the straddle seat. A left water deflector is disposed at a location between the left front wheel and the left footrest. A right water deflector is disposed at a location between the right front wheel and the right footrest.

18 Claims, 8 Drawing Sheets

WHEELED VEHICLE WITH WATER DEFLECTORS

FIELD OF THE INVENTION

The present invention relates to wheeled vehicles having water deflectors.

BACKGROUND OF THE INVENTION

As is commonly known, when wheeled vehicles are operated on a wet surface, their wheels cause some water to be lifted from the wet surface. Wheeled vehicle manufacturers therefore attempt to prevent the users of the vehicles from getting wet due to this lifted water.

In wheeled vehicles having bucket or bench seats, such as in automobiles, the users are typically located inside an enclosure which shields them from the water being lifted by the wheels.

This is not the case however in vehicles having a straddle seat where the users are exposed to the elements. Therefore, various components have been added to such vehicles to prevent water lifted by the wheels from getting the users wet when the vehicle is used on a wet surface.

In motorcycles, a rear fender is provided over the rear wheel to prevent water from being sprayed by the rear wheel on the back of the users. A front fender is also provided over the front wheel and moves therewith as it is being steered to prevent water from being sprayed by the front wheel on the users. Any water not stopped by front fender is blocked by the motorcycle frame or body located directly behind it.

All-terrain vehicles (ATVs) have two front wheels and two rear wheels and a straddle seat. An ATV user's feet generally rest on footrests located behind and aligned with the front wheels. In ATVs, the fenders for each wheel are integrated with the ATV's body. The rear fenders provide a similar function as the rear fender of a motorcycle. The front fenders, which are located in front of the user's feet, prevent water from spraying on the user's feet when the ATV is going straight. When the front wheels are turned to steer the ATV, the front wheel located on the outside of the turn sprays water away from the ATV, while the front wheel located on the inside of the turn sprays water towards the inside of the body and the corresponding front fender of the ATV. The user is therefore shielded from the water being lifted by the wheels of the ATV when it is operated on a wet surface.

Another type of straddle type vehicle has three wheels. There are two possible configurations for three-wheeled vehicles: one wheel at the front with two wheels at the back or two wheels at the front and one wheel at the back.

In the first configuration (one wheel at the front), fenders similar to those used in a motorcycle can be used to prevent water from being sprayed by the wheels on the user.

In the second configuration (two wheels at the front), various attempts were made to prevent water from being sprayed by the wheels on the user. For the single rear wheel, a fender similar to those used in a motorcycle can be used to prevent water from being sprayed by the rear wheel on the back of the user. Providing fixed front fenders over the two front wheels, which are spaced apart from the body of the vehicle, does not satisfactorily prevent water from being sprayed on the user since when the front wheels are turned to steer the vehicle, the front wheel located on the inside of the turn sprays water directly on the user. Therefore, attempts were made to use fenders that would turn with the front wheels of the vehicle as it is being steered, as illustrated in United States published patent application number US 2005-0039967 A1, filed Aug. 18, 2004. However, even by using these fenders some water is still being sprayed by the front wheels on the user of the vehicle.

When a wheel rolls on a wet surface, the portion of the wheel that leaves the ground as the wheel moves forward projects some water upwardly and rearwardly in a plane of rotation of the wheel. This first way in which a water spray is generated can be addressed by the addition of a fender on the wheel, as is known in the prior art.

By making the portions of the front fenders located behind the front wheels closer to the ground improved the water shielding provided by the front fenders. However, it was found that regardless of how close the bottom of the front fenders get to the ground, some water is still being sprayed by the front wheels on the user of the vehicle, and more particularly on the user's feet, when the vehicle is operated on a wet surface.

A wheel rolling on a wet surface also generates other water sprays. The rolling wheel causes the water to separate to either sides thereof and move upwardly as the wheel comes into contact with the wet surface when rolling. Part of this is due to the design of tire thread patterns which attempt to evacuate water to the sides of the tires. From the reference frame of the moving vehicle, the water spray generated in this second way, moves diagonally rearwardly to either sides of the wheel. This spraying effect not only occurs when the wheel rolls in a puddle of water, but also when the wheel rolls on a wet or damp surface. Since this type of water spray is generated at the front or at the point of contact of the wheel with the ground, the addition of a fender to the wheel, which provides water shielding directly behind the wheel, does not address the problem.

This means that in a three-wheeled vehicle having two front wheels, the portions of the water sprays being generated in the second way and which are located between the front wheels and the body of the vehicle will cause the user of the vehicle to get wet.

Therefore, there is a need for a straddle type three-wheeled vehicle having two front wheels which reduces the amount of water being sprayed on the user of the vehicle by the front wheels when the vehicle is used on a wet surface.

STATEMENT OF THE INVENTION

One aspect of the present invention provides a three-wheeled straddle type vehicle having water deflectors positioned so as to prevent water sprays generated by the front wheels in the second way described above from reaching the user.

In another aspect, the invention provides a vehicle having a frame, a straddle seat disposed on the frame, a left front wheel and a right front wheel. Each of the front wheels is mounted to the vehicle via a front suspension and each front wheel has a fender associated therewith. The vehicle also has at least one rear wheel mounted to the vehicle via a rear suspension. An engine is mounted to the frame. The engine powers at least one of the wheels. Handlebars are disposed forwardly of the straddle seat and are operatively connected to the front wheels to steer the front wheels. Each of the front wheels and its corresponding fender turns about a generally vertical pivot axis when steered. A left footrest is disposed on a left side of the vehicle at a location below the straddle seat. A right footrest is disposed on a right side of the vehicle at a location below the straddle seat. A left water deflector has at least one portion disposed at a location between the left front wheel and the left footrest such that the left water deflector deflects water sprayed by the left front wheel away from the left foot rest. A right water deflector has at least one portion disposed at a location between the right front wheel and the right footrest such that the right water deflector deflects water sprayed by the right front wheel away from the right foot rest.

In an additional aspect, the at least one portion of the left water deflector is disposed at a location diagonally between the left front wheel and the left footrest, and the at least one portion of the right water deflector is disposed at a location diagonally between the right front wheel and the right footrest.

In a further aspect, the at least one portion of the left water deflector is disposed at a location laterally between the left front wheel and the left footrest, and the at least one portion of the right water deflector is disposed at a location laterally between the right front wheel and the right footrest.

In an additional aspect, the at least one portion of the left water deflector is disposed at a location longitudinally between the left front wheel and the left footrest, and the at least one portion of the right water deflector is disposed at a location longitudinally between the right front wheel and the right footrest.

It should be noted that the terms "at a location diagonally between", "at a location laterally between", and "at a location longitudinally between" refer to the location in space of an element on a diagonal, lateral, or longitudinal line, as the case may be, extending from one point to another and not to the element's orientation (i.e. the element is located somewhere on the diagonal/lateral/longitudinal line but it is not necessarily oriented along that line, although, in some cases, it is contemplated that it could be).

In a further aspect, the at least one portion of the left water deflector is disposed lower on the vehicle than the left footrest, and the at least one portion of the right water deflector is disposed lower on the vehicle than the right footrest.

In an additional aspect, each water deflector, when on the vehicle, has at least a portion disposed at an angle from a longitudinal centerline of the vehicle such that the rear end of the angled portion is further away from the longitudinal centerline than a forward end of the angled portion.

In a further aspect, each water deflector, when mounted to the vehicle, has a first portion extending generally longitudinally and a second portion extending rearwardly from the first portion. The second portion also extends laterally away from a longitudinal centerline of the vehicle.

In an additional aspect, when the vehicle is operated on a wet surface, the left front wheel sprays water along a first spray path towards the left footrest and the right front wheel sprays water along a second spray path towards the right footrest. The left water deflector intersects the first spray path and deflects the water away from the left footrest, and the right water deflector intersects the second spray path and deflects the water away from the right footrest.

In a further aspect, the vehicle also has a plurality of body panels disposed on the frame, and each of the water deflectors is integrally formed with one of the plurality of body panels.

In a further aspect, a bottom rear portion of each fender extends below a center of its corresponding front wheel.

In an additional aspect, the at least one rear wheel is a single rear wheel having a fender associated therewith.

In another aspect, the invention provides a vehicle having a frame, a straddle seat disposed on the frame, a left front wheel and a right front wheel. Each of the front wheels is mounted to the vehicle via a front suspension and each front wheel has a fender associated therewith. The vehicle also has at least one rear wheel mounted to the vehicle via a rear suspension. An engine is mounted to the frame. The engine powers at least one of the wheels. Handlebars are disposed forwardly of the straddle seat and are operatively connected to the front wheels to steer the front wheels. Each of the front wheels and its corresponding fender turns about a generally vertical pivot axis when steered. A left footrest is disposed on a left side of the vehicle at a location below the straddle seat. A right footrest is disposed on a right side of the vehicle at a location below the straddle seat. A left water deflector has at least one portion disposed at a location rearwardly of the left front wheel such that the left water deflector deflects water sprayed by the left front wheel away from the left foot rest. A right water deflector has at least one portion disposed at a location rearwardly of the right front wheel such that the right water deflector deflects water sprayed by the right front wheel away from the right foot rest.

For purposes of this application, terms used to locate elements on the vehicle, such as "front", "back", "rear", "left", "right", "up", "down", "above", and "below", are as they would normally be understood by a rider of the vehicle sitting on the vehicle in a forwardly facing, driving position. The term "longitudinal" means extending in a front to back orientation.

Embodiments of the present invention each have at least one of the above-mentioned aspects, but do not necessarily have all of them.

Additional and/or alternative features, aspects, and advantages of the embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE INVENTION

Figure 1:
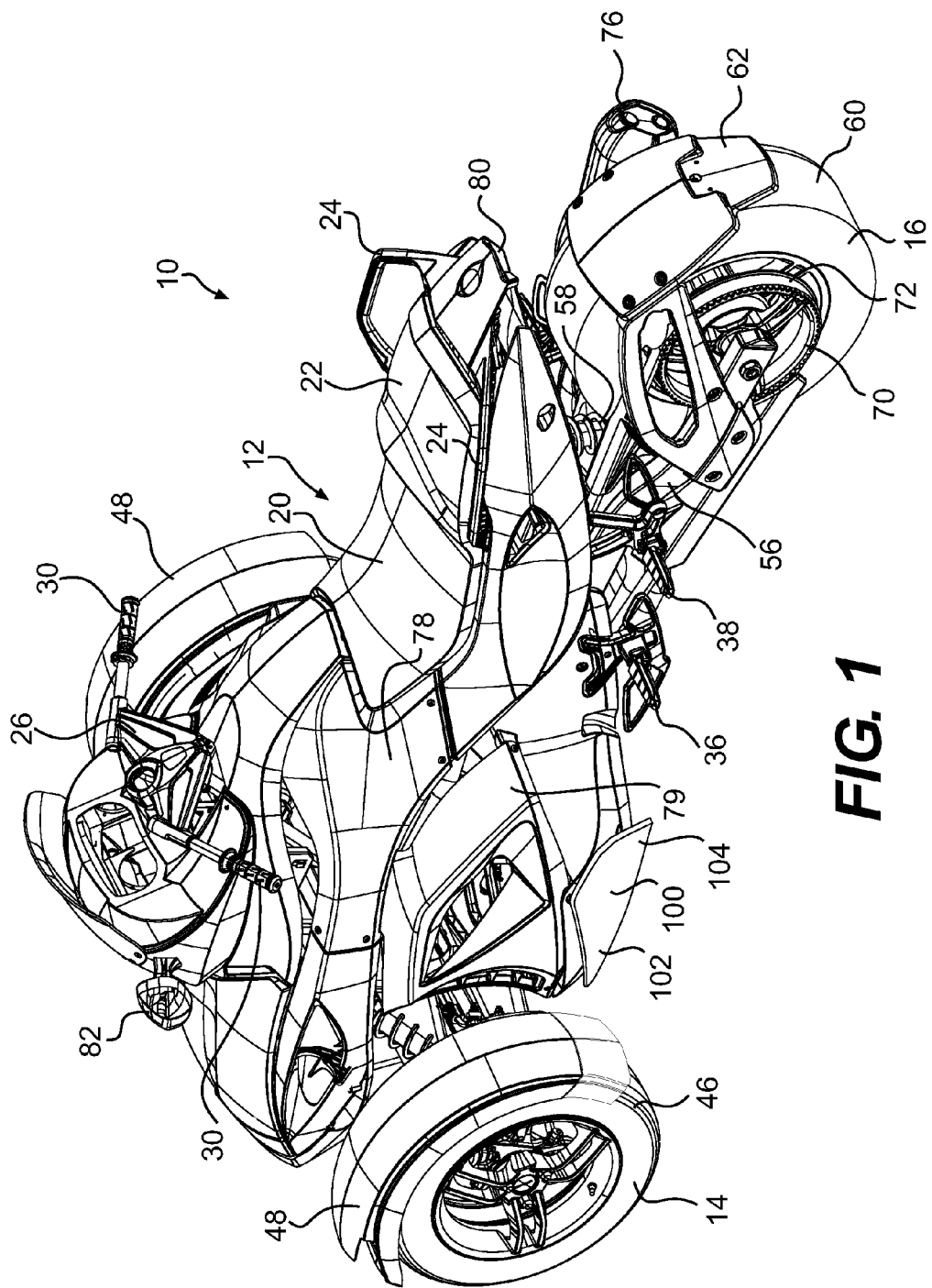
FIG. 1 is a perspective view, taken from a rear, left side, of a vehicle in accordance with the present invention.

Although the invention is being described herein with respect to a three-wheeled straddle type vehicle having two front wheels, it is contemplated that the invention could also be applied to other types of straddle type vehicles having two front wheels which are spaced apart from the body of the vehicle, such as some types of four-wheeled road vehicles.

As seen in FIGS. 1 to 6, the vehicle 10 has a straddle seat 12 located at least partially rearwardly of a center of the vehicle 10 and disposed along the longitudinal centerline 18 (FIG. 2) thereof. The straddle seat 12 has a first portion 20 for accommodating a driver, and a second portion 22 for accommodating a passenger behind the driver. The second portion 22 is higher than the first portion 20 to permit the passenger to see in front of the vehicle 10 over the driver. A pair of handles 24 are provided on either side of the second portion 22 for the passenger to hold onto. It is contemplated that the straddle seat 12 could be disposed at a different longitudinal location depending on the particular ergonomics of the vehicle 10. It is also contemplated that the straddle seat 12 could only have the first portion 20 for the driver.

A steering assembly is disposed forwardly of the straddle seat 12 to allow a driver to steer the two front wheels 14. The steering assembly has handlebars 26 connected to a steering column (not shown). The steering column is connected to the two front wheels 14 via tie rods 27 which connect to the wheel spindles (not shown), such that turning the handlebars 26 turns the steering column which, through the tie rods 27, turns the front wheels 14. The steering assembly can optionally be provided with a power steering unit which facilitates steering of the vehicle 10. The handlebars 26 are provided with handles 30 for the driver to hold. The right handle 30 can twist and acts as the throttle controller for the engine 32 (schematically shown in FIG. 5). It is contemplated, that the throttle could also be controlled by a separate lever disposed near one of the handles 30. A brake actuator, in the form of a hand brake lever 34, is provided near the right handle 30 for braking the vehicle 10. As seen in the figures, the hand brake lever 34 is provided generally forwardly of the right handle 30 so as to be actuated by multiple fingers of a user, however, it is contemplated that the hand brake lever 34 could be provided generally forwardly of the left handle 30.

Figure 6:
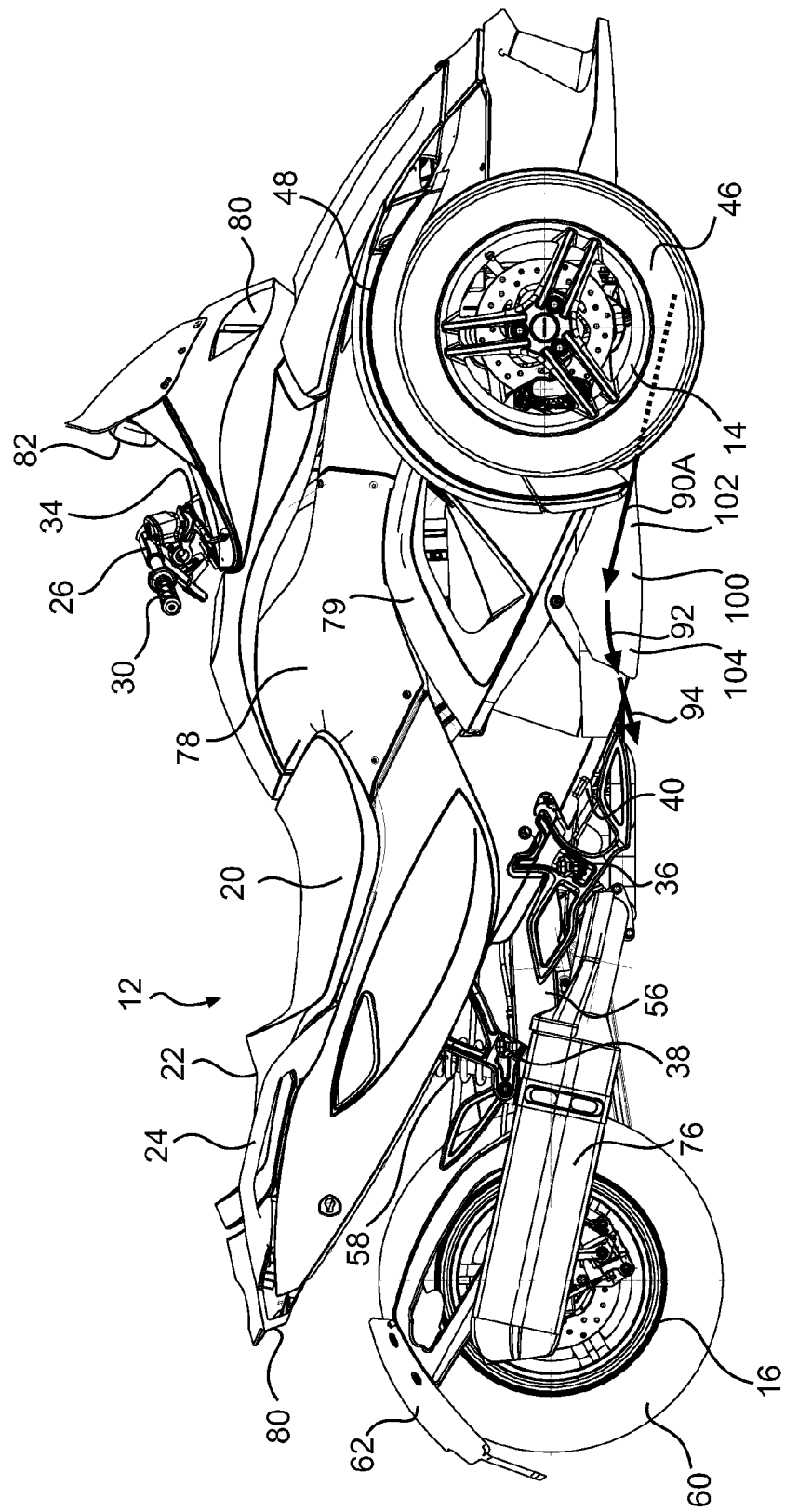
FIG. 6 is a right side elevation view of the vehicle of FIG. 1.

A pair of footrests in the form of driver foot pegs 36 are provided on either sides of the vehicle 10 below the first portion 20 of the straddle seat 12 for a driver to rest his feet thereon. Similarly a pair of footrests in the form of passenger foot pegs 38 are provided on either sides of the vehicle 10 rearwardly and upwardly from foot pegs 36, below the second portion 22 of the straddle seat 12 for a passenger to rest his feet thereon. Alternatively, the footrests could be in the form of plates that would support a greater portion of the driver's and passenger's feet. In cases where the second portion 22 of the straddle seat 12 is omitted, the passenger foot pegs 38 would also be omitted. Another brake actuator, in the form of a foot brake lever 40, is provided on a right side of the vehicle 10 below the first portion 20 of the straddle seat 12 for braking the vehicle 10. As best seen in FIG. 6, the foot brake lever 40 is provided near the right driver foot peg 36 such that the driver can actuate the foot brake lever 40 while a portion of his foot remains on the right driver foot peg 36. The foot brake lever 40 also preferably pivots about an axis which is coaxial with the right driver foot peg 36 in order to facilitate the actuation of the foot brake lever 40 by the driver.

Figure 5:
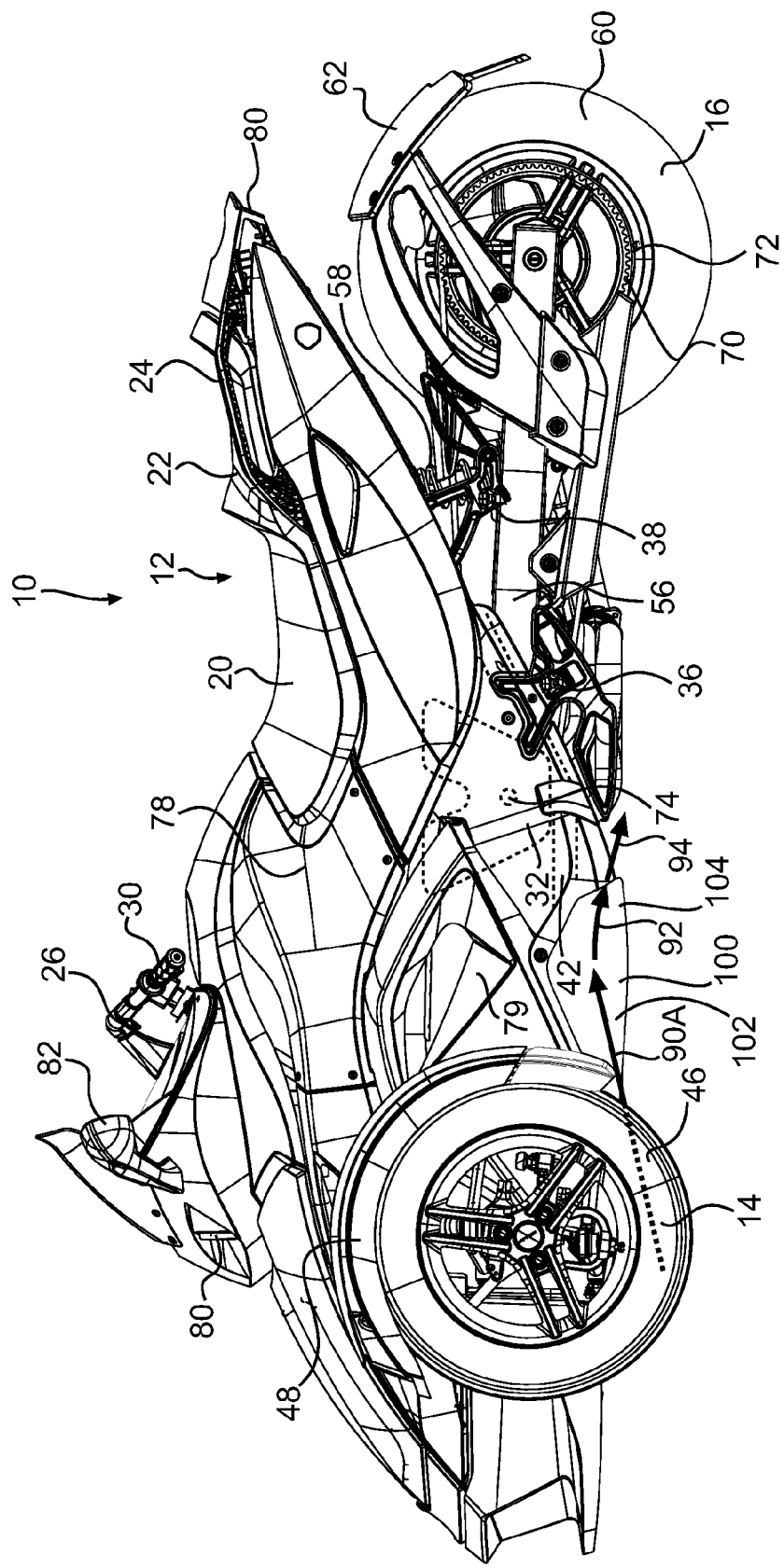
FIG. 5 is a left side elevation view of the vehicle of FIG. 1.

Each of the two front wheels 14 is mounted to the frame 42 (a portion of which is schematically shown in FIG. 5) of the vehicle 10 via a front suspension 44. Each of the two front wheels 14 has a tire 46 thereon which is suitable for road use. The tires 46 are preferably inflated to a pressure between 138 kPa and 345 kPa. A fender 48 is disposed over each wheel 14 to protect the driver from dirt and water which can be lifted by the wheel 14 while it is rolling. Each fender 48 is mounted to the wheel spindle (not shown) so as to turn with the wheel 14 when it is steered. The bottom rear portion of each fender 48 preferably extends as close to the ground as possible to shield the rider as much as possible from water being lifted by the front wheels 14 when the vehicle 10 is operated on a wet surface. As best seen in FIGS. 5 and 6, the bottom rear portion of each fender 48 extends below the center of the wheels 14. Each of the two front wheels 14 is also provided with a brake (not shown). The brake is preferably a disc brake mounted onto a wheel hub of each wheel 14, however other types of brakes are contemplated.

The rear wheel 16 is mounted to the frame 42 via a swing arm 56. The swing arm 56 has two arms pivotally mounted at a front thereof to the frame 42 and between which the rear wheel 16 is rotatably mounted at the rear of the two arms. A shock absorber unit 58 is disposed between the swing arm 56 and the frame 42. The rear wheel 16 has a tire 60 thereon which is suitable for road use. The tire 60 is wider than the tires 46. It is contemplated that the tire 60 could have a smaller width or the same width as the tires 46. It is also contemplated that the rear wheel 16 could have two or more tires disposed next to each other thereon and still be considered a single rear wheel in the context of the present invention. The tire 60 is preferably inflated to a pressure between 138 kPa and 345 kPa. A fender 62 is disposed over the wheel 16 to protect the driver from dirt and water which can be lifted by the wheel 16 while it is rolling. The fender 62 is mounted to the swing arm 56 via brackets 63 so as to move up and down with the wheel 16 as it follows the surface of the ground. The rear wheel 16 is provided with a brake (not shown). The brake is preferably a disc brake mounted to a right side of wheel 16. A wheel sprocket 70 is mounted to a left side of the rear wheel 16. A belt 72 is disposed about the wheel sprocket 70 and a driving sprocket (not shown) to transmit power from the engine 32, which is mounted to the frame 42, to the rear wheel 16. The driving sprocket preferably receives power from the engine 32 via a transmission (not shown). The transmission is operatively connected to the crankshaft 74 (schematically illustrated in FIG. 5) of the engine 32. It is contemplated that a continuously variable transmission (CVT) could be provided between the crankshaft 74 and the driving sprocket.

As can also be seen in FIGS. 1 to 6, an exhaust pipe 76 extending on the right side of the vehicle 10 towards the rear thereof is attached to an exhaust port (not shown) of the engine 32 to improve engine performance and to reduce the noise level of the engine 32. A vehicle body 78, having body panels 79, is attached to the frame 42 in order to protect the components mounted to the frame 42 and to make the vehicle 10 aesthetically pleasing. Components necessary to make vehicle 10 suitable for road use, such as lights 80 and a rear view mirror 82, are mounted to the vehicle body 78.

As previously mentioned, when the vehicle 10 is operated on a wet surface, the front wheels 14 generate water sprays 90A, 90B at the front or at the point of contact of the front wheels 14 with the ground. From the frame of reference of the moving vehicle 10, the water sprays 90A, 90B move diagonally rearwardly and upwardly to either sides of the front wheels 14, as seen in FIGS. 2 and 5 to 8. Water sprays 90B move away from the vehicle 10 and therefore do not cause the rider and passenger to get wet. Water sprays 90A on the other hand move toward foot pegs 36 and 38 and, if unaddressed, will cause the rider's and passenger's feet to get wet. The rear wheel 16 generates similar water sprays, but since they are located behind the rider and passenger, they will not cause them to get wet and therefore do not need to be addressed.

Figure 2:
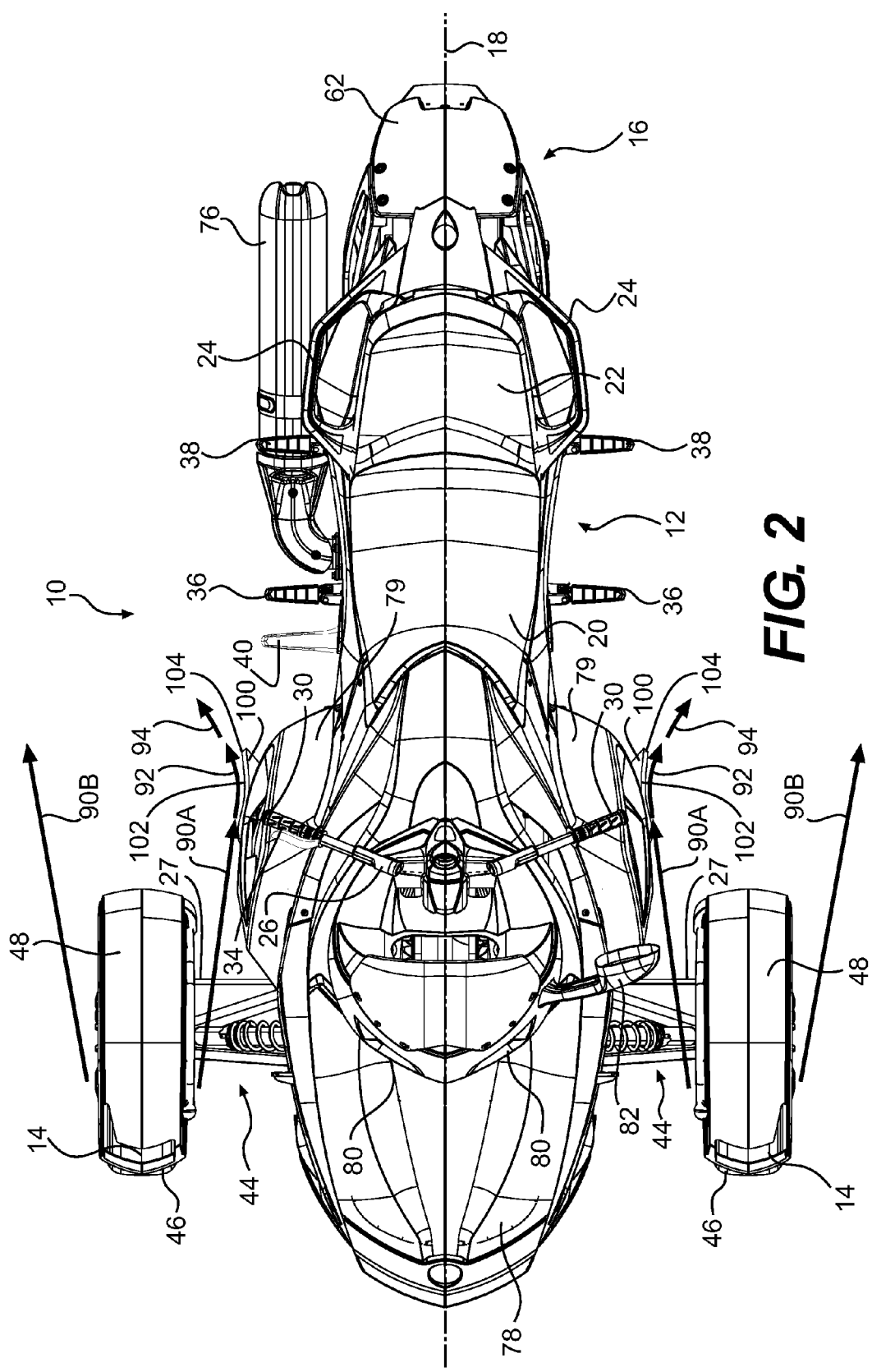
FIG. 2 is a top view of the vehicle of FIG. 1.
Figure 3:
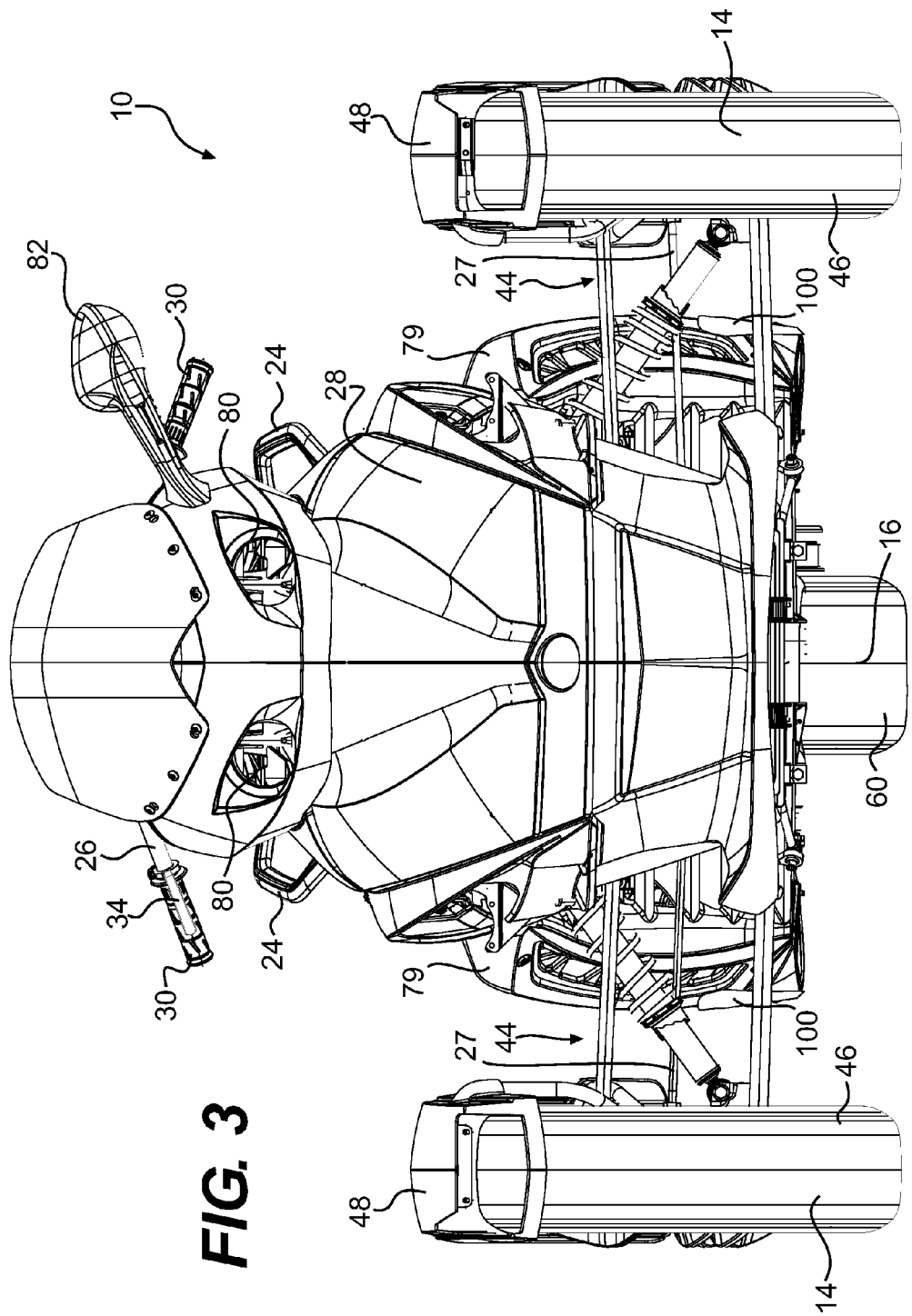
FIG. 3 is front view of the vehicle of FIG. 1.
Figure 4:
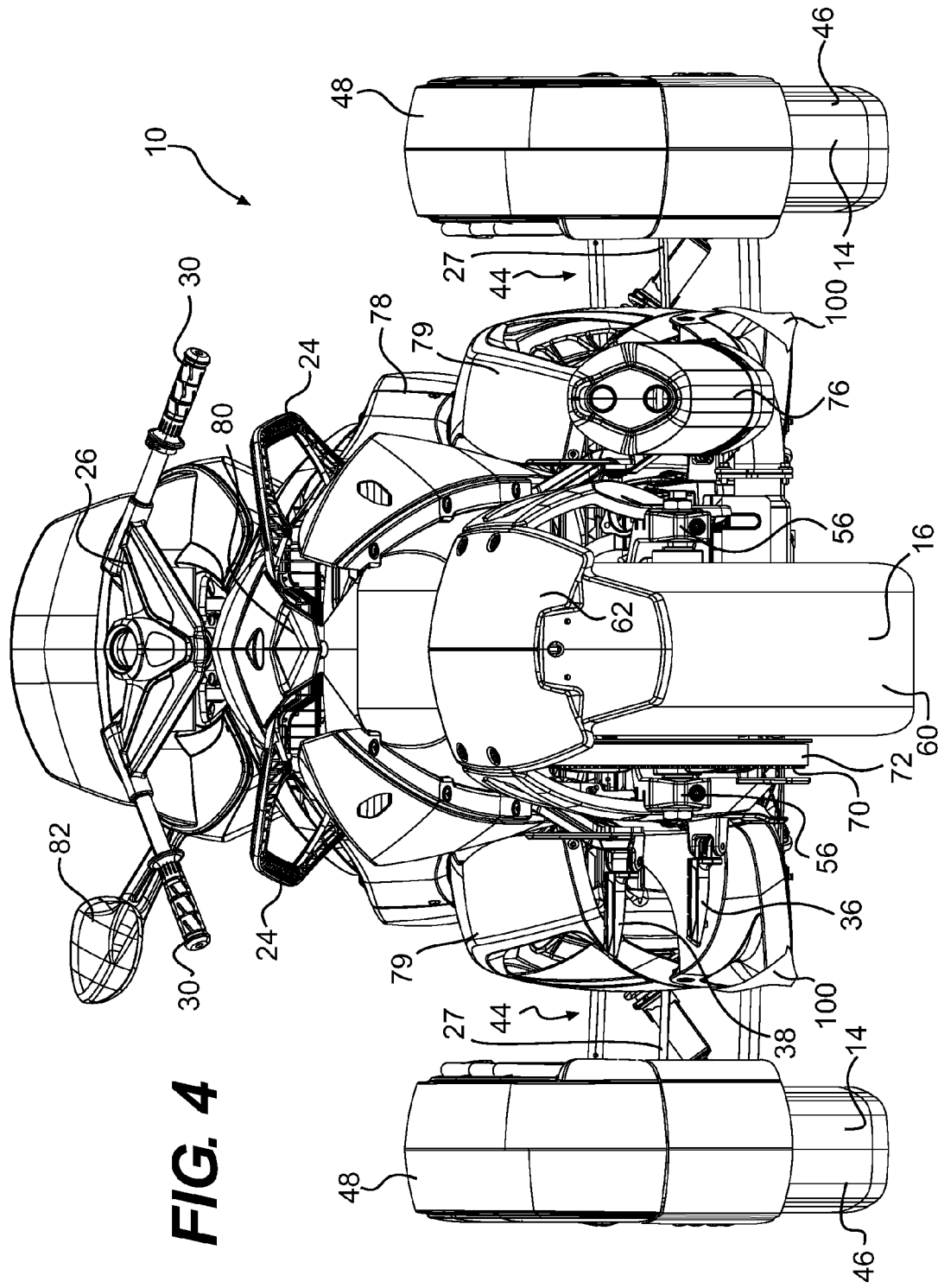
FIG. 4 is a back view of the vehicle of FIG. 1.
Figure 7:
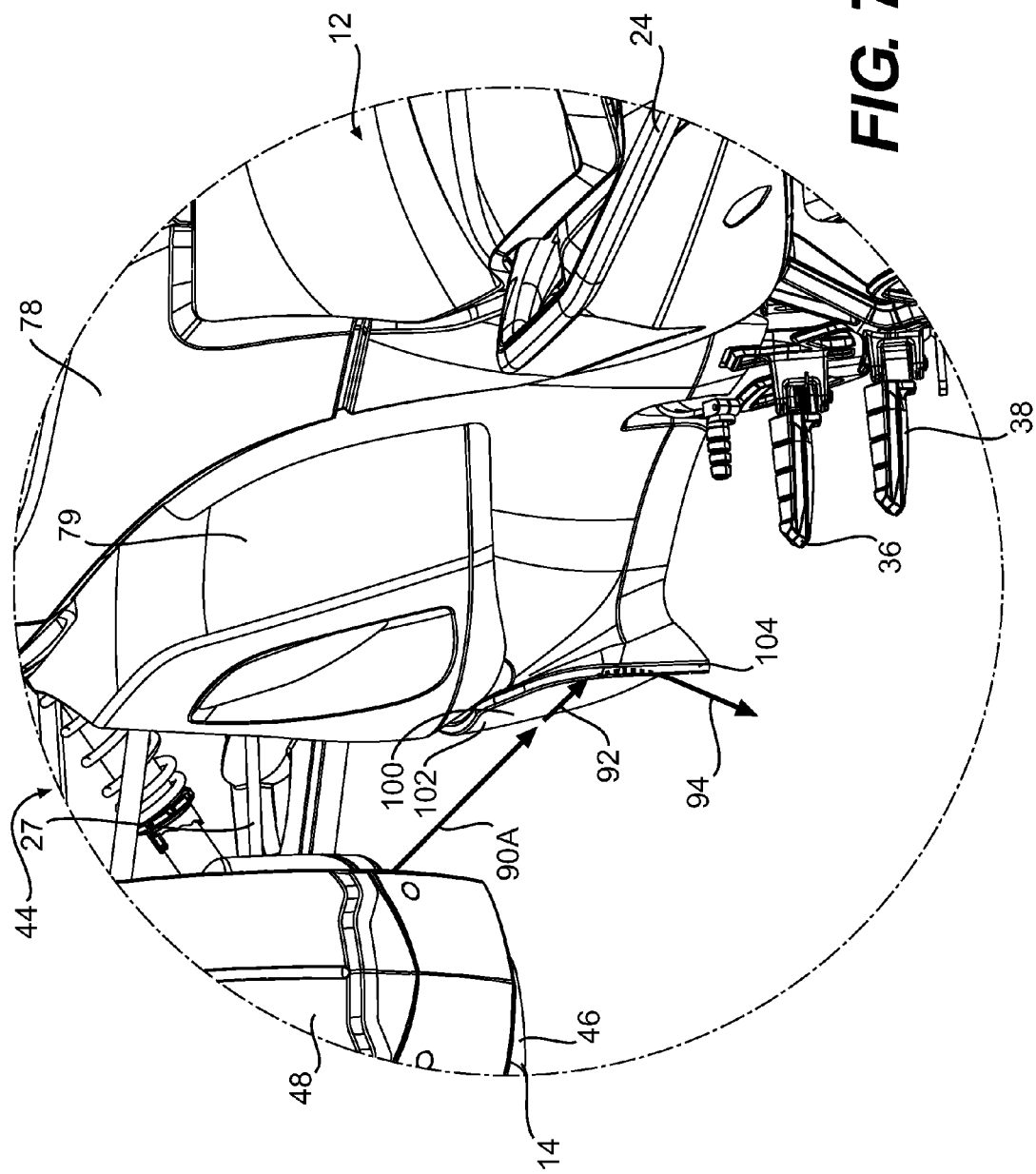
FIG. 7 is a close-up view, taken from a rear side, of a left water deflector located on the vehicle of FIG. 1.

In order to prevent the water sprays 90A to reach the foot pegs 36, 38, a water deflector 100 is disposed on each side of the vehicle 10 at a location between each front wheel 14 and their corresponding foot pegs 36, 38 in order to deflect the water sprays 90A away from the foot pegs 36, 38. As best seen in FIG. 2, each water deflector 100 is disposed at a location which is laterally and longitudinally between its corresponding front wheel 14 and foot peg 36. As best seen in FIG. 5, each water deflector 100 is also disposed lower on the vehicle 10 than its corresponding foot peg 36. In a preferred embodiment, at least a portion of each water deflector 100 is also disposed at a location higher than the bottom rear portion of its corresponding fender 48. In other words, each water deflector 100 is disposed at a location diagonally between its corresponding front wheel 14 and foot peg 36. In this position, each water deflector 100 intersects the path of its corresponding water spray 90A and deflects the water spay 90A away from its corresponding foot pegs 36, 38 as best seen in FIG. 7, thus preventing the rider's and passenger's feet from getting wet.

Although in the illustrated embodiment, each water deflector 100 is shown as being completely located between its corresponding front wheel 14 and foot peg 36, it is contemplated that only one or more portions of each water deflector 100 could be located in such a location.

Figure 8:
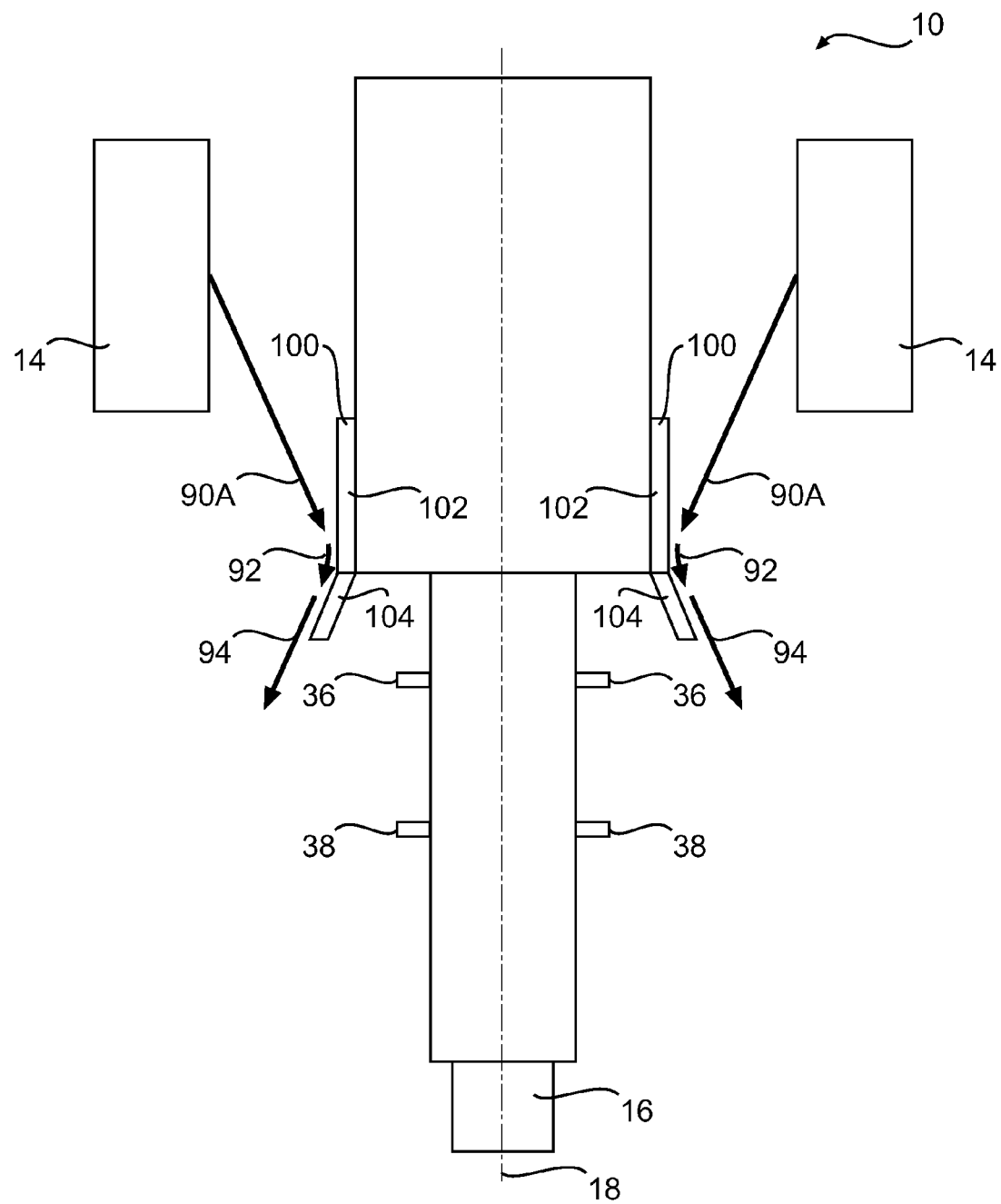
FIG. 8 is a partial schematic representation of a top view of the vehicle of FIG. 1.

Turning now to FIG. 8, the details of the water deflectors 100 and the way in which they deflect water will be explained. This will be explained with respect to one side of the vehicle 10, and it should be understood that the manner in which the water is deflected on the other side of the vehicle 10 is identical. Note that elements of the vehicle 10 which are not necessary to this explanation were not included in the schematic illustration shown in FIG. 8 in order to facilitate understanding. It should also be noted that in FIG. 8, and the other figures where they are shown, the path of the water sprays 90A have been illustrated as a line for ease of understanding. It should be understood however that the water sprays 90A actually spray water on a larger surface of the water deflectors 100 which is determined by the vehicle speed, the degree of wetness of the surface on which the vehicle 10 is being operated, and the orientation of the front wheels 14.

As seen in FIG. 8, the water deflector 100 has a first portion 102 which extends generally longitudinally along the side of the vehicle body 78. The water deflector 100 has a second portion 104 which is located rearwardly of the first portion 102. From the first portion 102, the second portion 104 extends rearwardly and laterally away from the longitudinal centerline 18 of the vehicle 10. Therefore, the second portion 104 is disposed at an angle from the longitudinal centerline 18 where the rear end of the second portion 104 is further away from the longitudinal centerline 18 than a forward end thereof. In the preferred embodiment, the rear end of the second portion 104 is closer to the longitudinal centerline 18 of the vehicle 10 than its corresponding front wheel 14 when it is steered in a straight ahead direction, as shown. As seen in FIG. 7, both the first and second portions 102, 104 define generally vertical surfaces. The first and second portion 102, 104 are preferably integrally formed with each other, however it is contemplated that they could be distinct components. In the preferred embodiment, the water deflectors 100 are integrally formed with the body panels 79. Alternatively, it is contemplated that the water deflectors 100 could be fastened or otherwise attached to the vehicle 10. It is also contemplated that the water deflectors 100 could also consist only of the second portion 104, or that the body panel 79 itself could be used as the first portion 102.

As seen in FIG. 8, the water spray 90A coming from the front wheel 14 sprays water on the first portion 102 of the water deflector 100. The water then moves on the water deflector 100 along path 92, the water then moves along and off of the rear end of the second portion 104 along path 94. Since the second portion 104 is angled with respect to the longitudinal centerline of the vehicle 10, the water is deflected away from foot pegs 36, 38, as illustrated by path 94, thus keeping the water from water spray 90A away from the feet of the rider and passenger. It is also contemplated that the second portion 104 of the water deflector 100 could be angled so as to additionally deflect the water downwardly.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A vehicle comprising:
a frame;
a straddle seat disposed on the frame;
a left front wheel and a right front wheel, each of the front wheels being mounted to the vehicle via a front suspension, each front wheel having a fender associated therewith;
at least one rear wheel mounted to the vehicle via a rear suspension;
an engine mounted to the frame, the engine powering at least one of the wheels;
handlebars disposed forwardly of the straddle seat and operatively connected to the front wheels for steering the front wheels, each of the front wheels and its corresponding fender turning about a generally vertical pivot axis when steered;
a left footrest disposed on a left side of the vehicle at a location below the straddle seat;
a right footrest disposed on a right side of the vehicle at a location below the straddle seat;
a left water deflector having at least one portion disposed at a location between the left front wheel and the left footrest; and
a right water deflector having at least one portion disposed at a location between the right front wheel and the right footrest;
wherein when the vehicle is operated on a wet surface, the left front wheel sprays water along a first spray path towards the left footrest and the right front wheel sprays water along a second spray path towards the right footrest; and
wherein the left water deflector intersects the first spray path and deflects the water away from the left footrest, and the right water deflector intersects the second spray path and deflects the water away from the right footrest.

2. The vehicle of claim 1, wherein the at least one portion of the left water deflector is disposed at a location diagonally between the left front wheel and the left footrest, and
wherein the at least one portion of the right water deflector is disposed at a location diagonally between the right front wheel and the right footrest.

3. The vehicle of claim 1, wherein the at least one portion of the left water deflector is disposed at a location laterally between the left front wheel and the left footrest, and
wherein the at least one portion of the right water deflector is disposed at a location laterally between the right front wheel and the right footrest.

4. The vehicle of claim 3, wherein the at least one portion of the left water deflector is disposed at a location longitudinally between the left front wheel and the left footrest, and
wherein the at least one portion of the right water deflector is disposed at a location longitudinally between the right front wheel and the right footrest.

5. The vehicle of claim 1, wherein the at least one portion of the left water deflector is disposed lower on the vehicle than the left footrest, and
wherein the at least one portion of the right water deflector is disposed lower on the vehicle than the right footrest.

6. The vehicle of claim 1, wherein each water deflector, when on the vehicle, has at least a portion disposed at an angle from a longitudinal centerline of the vehicle such that the rear end of the angled portion is further away from the longitudinal centerline than a forward end of the angled portion.

7. The vehicle of claim 6, wherein the rear end of the angled portion of each water deflector is closer to the longitudinal centerline than an inwardmost portion of its corresponding front wheel steered in a straight ahead direction.

8. The vehicle of claim 1, wherein each water deflector, when mounted to the vehicle, has a first portion extending generally longitudinally and a second portion extending rearwardly from the first portion, the second portion also extending laterally away from a longitudinal centerline of the vehicle.

9. The vehicle of claim 8, wherein the first and second portions of each water deflector are integrally formed.

10. The vehicle of claim 8, wherein the second portion of each water deflector is closer to the longitudinal centerline than an inwardmost portion of its corresponding front wheel steered in a straight ahead direction.

11. The vehicle of claim 1, wherein the left footrest is a first left footrest and the right footrest is a first right footrest; and further comprising:
  a second left footrest disposed on the vehicle rearwardly and upwardly from the first left footrest; and
  a second right footrest disposed on the vehicle rearwardly and upwardly from the first right footrest;
  wherein the left water deflector deflects the water away from both the first and second left footrests, and the right water deflector deflects the water away from both the first and second right footrests.

12. The vehicle of claim 1, further comprising a plurality of body panels disposed on the frame; and
  wherein each of the water deflectors is integrally formed with one of the plurality of body panels.

13. The vehicle of claim 1, wherein a bottom rear portion of each fender extends below a center of its corresponding front wheel.

14. The vehicle of claim 13, wherein at least a portion of each water deflector is disposed at a location higher than the bottom rear portion of its corresponding fender.

15. The vehicle of claim 1, wherein the at least one rear wheel is a single rear wheel having a fender associated therewith.

16. A vehicle comprising:
  a frame;
  a straddle seat disposed on the frame;
  a left front wheel and a right front wheel, each of the front wheels being mounted to the vehicle via a front suspension, each front wheel having a fender associated therewith;
  at least one rear wheel mounted to the vehicle via a rear suspension;
  an engine mounted to the frame, the engine powering at least one of the wheels;
  handlebars disposed forwardly of the straddle seat and operatively connected to the front wheels for steering the front wheels, each of the front wheels and its corresponding fender turning about a generally vertical pivot axis when steered;
  a left footrest disposed on a left side of the vehicle at a location below the straddle seat;
  a right footrest disposed on a right side of the vehicle at a location below the straddle seat;
  a left water deflector having at least one portion disposed at a location rearwardly of the left front wheel; and
  a right water deflector having at least one portion disposed at a location rearwardly of the right front wheel;
  wherein when the vehicle is operated on a wet surface, the left front wheel sprays water along a first spray path towards the left footrest and the right front wheel sprays water along a second spray path towards the right footrest; and
  wherein the left water deflector intersects the first spray path and deflects the water away from the left footrest, and the right water deflector intersects the second spray path and deflects the water away from the right footrest.

17. The vehicle of claim 16, wherein each water deflector, when on the vehicle, has at least a portion disposed at an angle from a longitudinal centerline of the vehicle such that the rear end of the angled portion is further away from the longitudinal centerline than a forward end of the angled portion.

18. The vehicle of claim 16, wherein the at least one rear wheel is a single rear wheel having a fender associated therewith.

* * * * *